(12) United States Patent
Nagai

(10) Patent No.: US 9,993,984 B2
(45) Date of Patent: Jun. 12, 2018

(54) METHOD OF MANUFACTURING CORD INCLUDED RUBBER SHEET

(71) Applicant: TOYO TIRE & RUBBER CO., LTD., Osaka-shi, Osaka (JP)

(72) Inventor: Kunihiko Nagai, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 270 days.

(21) Appl. No.: 14/844,200

(22) Filed: Sep. 3, 2015

(65) Prior Publication Data

US 2016/0107403 A1    Apr. 21, 2016

(30) Foreign Application Priority Data

Oct. 16, 2014    (JP) .................................. 2014-211869

(51) Int. Cl.
*B29D 30/46*    (2006.01)
*B26F 3/00*    (2006.01)
(Continued)

(52) U.S. Cl.
CPC ................ *B29D 30/46* (2013.01); *B26D 3/00* (2013.01); *B26D 7/00* (2013.01); *B26F 3/00* (2013.01); *B29L 2030/00* (2013.01)

(58) Field of Classification Search
CPC . B29C 69/001; B29C 66/02241; B29C 65/18; B29C 65/305; B29C 66/431; B29C 67/0044; B29C 47/0066; B29C 47/02; B29C 47/0021; B29C 47/0038; B26D 7/27; B26D 3/003; B26D 1/0006; B26D 2001/0053; B26D 7/084; B26D 7/10; B26D 1/04; B26D 1/14; B26D 1/15; B26D 2001/006; B26D 3/02; B26D 3/06; B26D 3/085; B26D 7/14; B26D 7/2614; Y10T 83/9309; Y10T 83/293; Y10T 83/0414;
(Continued)

(56) References Cited

U.S. PATENT DOCUMENTS

| | | | | |
|---|---|---|---|---|
| 5,293,795 A | * | 3/1994 | Osawa | B26D 3/003 264/163 |
| 2002/0104413 A1 | * | 8/2002 | Adachi | B26D 7/27 83/16 |
| 2006/0185789 A1 | * | 8/2006 | Matsuoka | B26D 7/27 156/250 |

FOREIGN PATENT DOCUMENTS

| | | |
|---|---|---|
| JP | 4-220332 A | 8/1992 |
| JP | 2002-225153 A | 8/2002 |
| JP | 2013-193367 A | 9/2013 |

* cited by examiner

*Primary Examiner* — Jeffrey Wollschlager
*Assistant Examiner* — Armand Melendez
(74) *Attorney, Agent, or Firm* — Westerman, Hattori, Daniels & Adrian, LLP

(57) ABSTRACT

A method for manufacturing a cord included rubber sheet has an arrangement step and a cutting step. In the arrangement step, a band-like material of a cord included rubber sheet is supplied to a processing table, and a portion to be cut is arranged onto a groove. In the cutting step, the band-like material is cut by pressing the pressure cutting die, and the cord included rubber sheet having a predetermined length is obtained. A leading end of the pressure cutting die enters the groove and a die surface of the pressure cutting die contacts with an opening edge of the groove, in the cutting step, and a cut surface of the cord is coated with the rubber of the band-like material in a process that the die surface comes into contact with the opening edge after the leading end contacts with the band-like material.

3 Claims, 3 Drawing Sheets

(51) Int. Cl.
   *B26D 7/00*      (2006.01)
   *B26D 3/00*      (2006.01)
   *B29L 30/00*      (2006.01)

(58) Field of Classification Search
   CPC ................ B26F 1/20; B26F 2001/4427; B26F 2210/06; B26F 3/08; B26F 1/02; B26F 1/14; B26F 1/24; B26F 1/44; B26F 3/002; B26F 3/04; B26F 3/06
   USPC ............................................................ 83/19
   See application file for complete search history.

(a)

(b)

(c)

METHOD OF MANUFACTURING CORD INCLUDED RUBBER SHEET

BACKGROUND OF THE INVENTION

Field of the Invention

The present invention relates to a method for manufacturing a cord included rubber sheet such as a chafer formed by coating a plurality of cords with rubber.

Description of the Related Art

A pneumatic radial tire in FIG. 5 is provided with a chafer 10 which is a reinforcing member for a tire. The chafer 10 is a cord included rubber sheet formed by coating a plurality of cords with rubber. The chafer 10 is generally disposed so as to pinch a carcass ply 8 from an inner side in a tire width direction over an outer side, as shown in FIG. 5. With this structure, an increase in strain created in an end portion 8E of the carcass ply 8 is suppressed. As a result, generation of separation beginning at the end portion 8E is prevented, and thus durability is improved. However, in the case where strain created in an end portion 10E of the chafer increases, separation may be generated beginning at the end portion.

As shown in FIG. 6, a cord 10C is exposed in the end portion 10E of the chafer, and it is known that the exposure becomes a factor for increasing strain. Therefore, there has been conventionally a case where the cord 10C is coated by attaching a rubber sheet 9 in order to suppress the increase in the strain created in the end portion 10E. However, use of an additional member such as the rubber sheet 9 increases a tire weight, and further deteriorates a rolling resistance of the tire. This tendency is particularly evident in the tire for a passenger car.

Patent Document 1 discloses a step of cutting a band-like carcass ply raw material into a predetermined length; however, a cord is not exposed to a cut surface. Patent Document 2 discloses a method for cutting a band-like member in which a textile cord is buried, but does not suggest a solution to the problem relating to the exposure of the cord. Patent Document 3 discloses a method for cutting a raw material band-like member by pressing a die surface inclined at a shallow angle; however, it is difficult to cut a cord included rubber sheet according to this method. (refer to paragraphs 0003 and 0004 in Patent Document 2).

PRIOR ART DOCUMENTS

Patent Documents

Patent Document 1: JP-A-2013-193367
Patent Document 2: JP-A-7002-273
Patent Document 3: JP-A-4-220332

SUMMARY OF THE INVENTION

The present invention has been made in view of the circumstances, and an object of the present invention is to provide a method for manufacturing a cord included rubber sheet which can suppress exposure of a cord without use of any additional member.

The object can be achieved by the following present invention. The present invention provides a method for manufacturing a cord included rubber sheet comprising:

an arrangement step of supplying a band-like material of a cord included rubber sheet to a processing table, and arranging a portion be cut in the band-like material onto a groove which is formed in the processing table; and a cutting step of cutting the band-like material by moving a pressure cutting die having an angle of a leading end which is larger than an opening angle of the groove and is equal to or greater than 85 degrees, relatively closer to the processing table, and pressing the pressure cutting die in a thickness direction of the band-like material, and obtaining the cord included rubber sheet having a predetermined length, wherein a leading end of the pressure cutting die is caused to enter the groove and a die surface of the pressure cutting die is brought into contact with an opening edge of the groove, in the cutting step, and a cut surface of the cord is coated with the rubber of the band-like material in a process that the die surface comes into contact with the opening edge after the leading end of the pressure cutting die is in contact with the band-like material.

According to the method, the band-like material of the cord included rubber sheet is cut by pressing the pressure cutting die, and the cord included rubber sheet having the predetermined length is obtained. The portion to be cut of the band-like material is disposed on the groove, and the leading end of the pressure cutting die after cutting the band-like material further moves from the position on the surface of the processing table and enters the groove. Since the angle of the leading end of the pressure cutting die is greater than the angle of the opening of the groove, the die surface of the pressure cutting die comes into contact with the opening edge of the groove. As a result, it is possible to securely cut the band-like material including the cord, and to position the pressure cutting die.

In the process that the die surface comes into contact with the opening edge after the leading end of the pressure cutting die is in contact with the band-like material, the die surface of the pressure cutting die is rubbed on the cut surface of the band-like material. Further, since the angle of the leading end of the pressure cutting die is equal to or greater than 85 degrees and is great, the die surface is greatly inclined in relation to the thickness direction of the band-like material, and the contact area of the die surface with the band-like material is secured greatly. As a result, it is possible to suppress the exposure of the cord without use of any additional member by moving the rubber of the band-like material, particularly moving the rubber in the periphery of the cut surface of the cord, and coating the cut surface of the cord with the rubber.

DETAILED DESCRIPTION OF THE PREFERRED EMBODIMENTS

A description will be given of an embodiment according to the present invention with reference to the accompanying drawings. In the present embodiment, an example is described in which a chafer (an example of a cord included rubber sheet) having a predetermined length is manufactured by using a device in FIG. 1.

Figure 1:
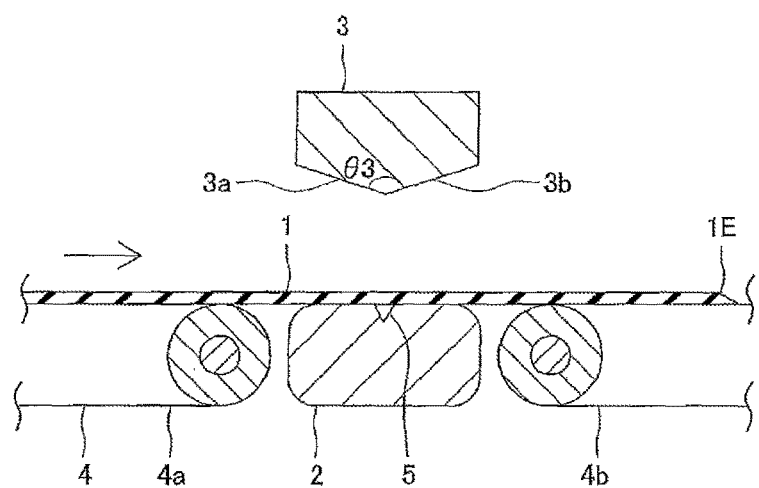
FIG. 1 is a cross sectional view schematically showing an example of a device for manufacturing a cord included rubber sheet.

The device for manufacturing a cord included rubber sheet shown in FIG. 1 is provided with a processing table 2 to which a band-like material 1 of a chafer is supplied, and a pressure cutting die 3 which is pressed against the band-like material 1. A position of the processing table 2 is fixed, and the pressure cutting die 3 is disposed above the processing table 2. The pressure cutting die 3 is structured such that the pressure cutting die 3 can reciprocate in a vertical direction by a moving mechanism (not shown). A carrying mechanism 4 has a function of carrying the chafer, and is provided with a pair of conveyors 4a and 4b which are provided in both sides of the processing table 2 in the present embodiment. The band-like material 1 is fed out toward the conveyor 4b on a downstream side from the conveyor 4a on an upstream side, that is, fed out toward a right side in FIG. 1.

The band-like material 1 of the chafer is formed by coating a plurality of cords with rubber. The cords are disposed in a direction which is parallel to or inclined in a longitudinal direction of the band-like material 1. An angle of inclination of the cord in relation to the longitudinal direction is, for example, between 0 and 70 degrees, and more preferably between 10 and 60 degrees. The cords which are inclined at opposite directions to each other may be disposed like a mesh. The cord is preferably made of an organic fiber such as nylon, rayon, polyester, polyethylene naphthalate (PEN), polyethylene terephthalate (PET), and aramid.

A thickness of the band-like material 1 is, for example, between 0.95 and 1.5 mm, and is smaller than a depth of a groove 5 in the processing table 2. Although not shown in the figure, a superposed body obtained by folding the long band-like material 1 is disposed on an upstream side of the conveyor 4a, and the band-like material 1 unfolded from the superposed body is supplied to the processing table 2 by the carrying mechanism 4. It is possible to use a roll obtained by rolling up the long band-like material 1 or a forming machine (for example, an extruding machine) for continuously forming the band-like material 1, in place of the superposed body.

Figure 2:
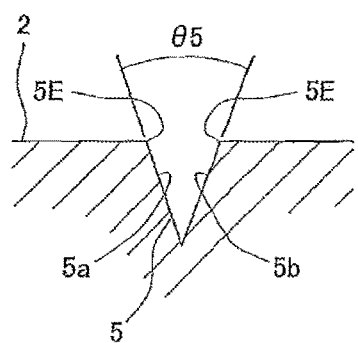
FIG. 2 is an enlarged view of a substantial part of a processing table.

As shown in FIG. 2 in an enlarged manner, the groove 5 which is open upward is formed in the processing table 2. A portion to be cut in the band-like material 1 is disposed on the groove 5. An opening angle θ5 is an angle formed by a wall surface 5a on an upstream side and a wall surface 5b on a downstream side. The wall surfaces 5a and 5b are inclined so as to come close to each other from a surface of the processing table 2 toward a groove bottom. An opening edge 5E is a ridge between the surface of the processing table 2 and each of the wall surfaces 5a and 5b. The groove 5 extends in a direction which is vertical to a paper surface of FIG. 1, and a length of the groove 5 is equal to or larger than a width of the band-like material 1. In the present embodiment, the groove 5 has a V-shaped cross section; however, is not limited to this. For example, the groove 5 may have a shape in which the groove bottom is curved.

The pressure cutting die 3 has a leading end which is tapered toward the processing table 2, and a pair of die surfaces 3a and 3b which are in contact at the leading end. An angle θ3 of the leading end is an angle which is formed by the die surface 3a on the upstream side and the die surface 3b on the downstream side. The angle θ3 of the leading end is greater than the opening angle θ5 of the groove 5, and is equal to or greater than 85 degrees. Each of the die surfaces 3a and 3b is inclined in relation to the surface of the band-like material 1. The leading end of the pressure cutting die 3 extends in a direction which is vertical to the paper surface of FIG. 1, and a length of the leading end is equal to or longer than the width of the band-like material 1. In a state where the pressure cutting die 3 is moved closest to the processing table 2, the leading end of the pressure cutting die 3 enters the groove 5 (see FIG. 3(c)).

In order to obtain the chafer having a predetermined length, first of all, the band-like material 1 of the chafer is supplied to the processing table 2 and the portion to be cut in the band-like material 1 is disposed on the groove 5 (corresponding to an arranging step), as shown in FIG. 1. At this time, the carrying mechanism 4 feeds out the band-like material 1 to the downward side such that the length of the band-like material 1 from the position of the groove 5 to an end portion 1E is the predetermined length. The predetermined length is a length which is necessary for forming a tire, and differs depending on a tire size.

Figure 3:
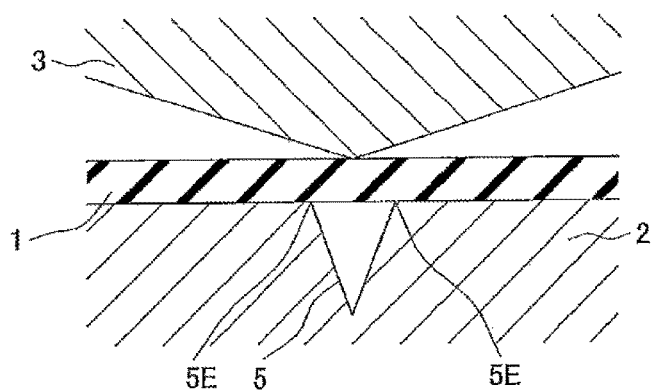
FIG. 3 is a cross sectional view showing a state of cutting a chafer.
Figure 3:
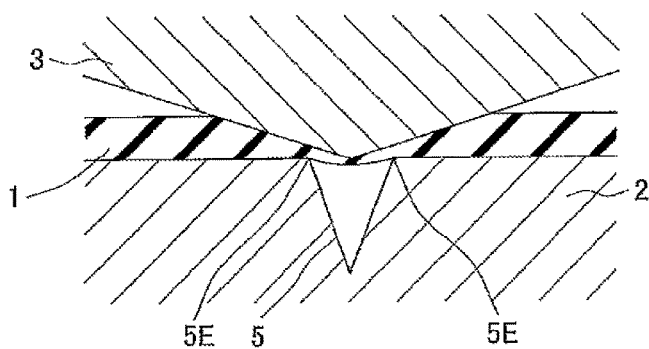
Figure 3:
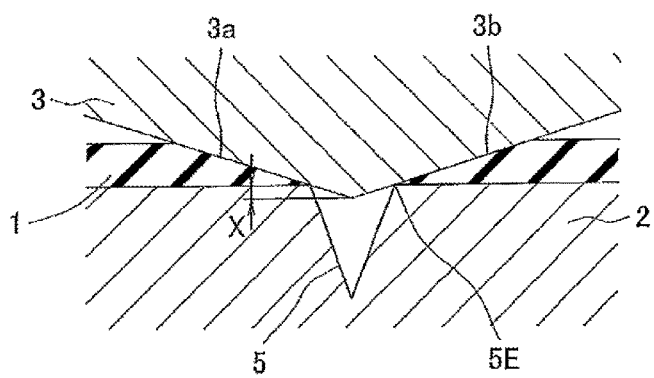

Next, the pressure cutting die 3 is moved relatively close to the processing table 2, the band-like material 1 is cut by pressing the pressure cutting die 3 in the thickness direction of the band-like material 1 as shown in FIG. 3, and the chafer having the predetermined length is obtained (corresponding to a cutting step). In the present embodiment, the pressure cutting die 3 comes close to the processing table 2 by the downward movement of the pressure cutting die 3. The pressure cutting die 3 coming close to the processing table 2 comes into pressure contact with the band-like material 1 from the leading end thereof so as to apply pressure in the thickness direction. The band-like material 1 is sheared by the approaching movement of the pressure cutting die 3.

In the cutting step, the leading end of the pressure cutting die 3 is caused to enter the groove 5, and the die surfaces 3a and 3b of the pressure cutting die 3 are brought into contact with the opening edges 5E. Since the angle θ3 of the leading end of the pressure cutting die 3 is larger than the opening angle θ5 of the groove 5, each of the die surfaces 3a and 3b comes into contact with the opening edge 5E. With this structure, it is possible to securely cut the band-like material 1 including the cord. Further, the die surfaces 3a and 3b come into contact with the opening edges 5E, and thus the pressure cutting die 3 is positioned in relation to the processing table 2. In a state where the pressure cutting die 3 is moved closest to the processing table 2, the die surfaces 3a and 3b are in contact with the entire cut surface of the band-like material 1.

Further, in the cutting step, the cut surface of the cord is coated with the rubber of the band-like material 1 in the process that the die surfaces 3a and 3b come into contact with the opening edges 5E after the leading end of the pressure cutting die 3 is in contact with the band-like material 1. Specifically, in the process from FIG. 3(a) to FIG. 3(c), the die surfaces 3a and 3b are rubbed on the cut surface of the band-like material 1, and the rubber of the band-like material 1 dragged accordingly, particularly the rubber in the periphery of the cut surface of the cord is put on the cut surface of the cord. Since the angle θ3 of the leading end is equal to or greater than 85 degrees and is great, the die surfaces 3a and 3b are greatly inclined in relation to the thickness direction of the band-like material 1, and the contact area between the band-like material 1 and the die surfaces 3a and 3b is secured. As a result, it is possible to smoothly achieve the motion of the rubber as mentioned above.

Figure 4:
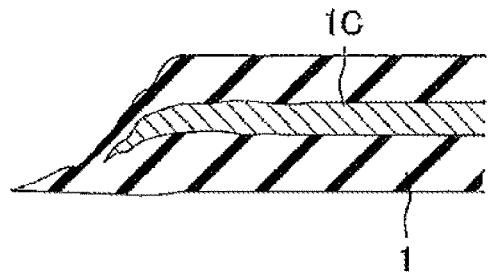
FIG. 4 is a cross sectional view showing an end portion of a chafer which is cut.
Figure 5:
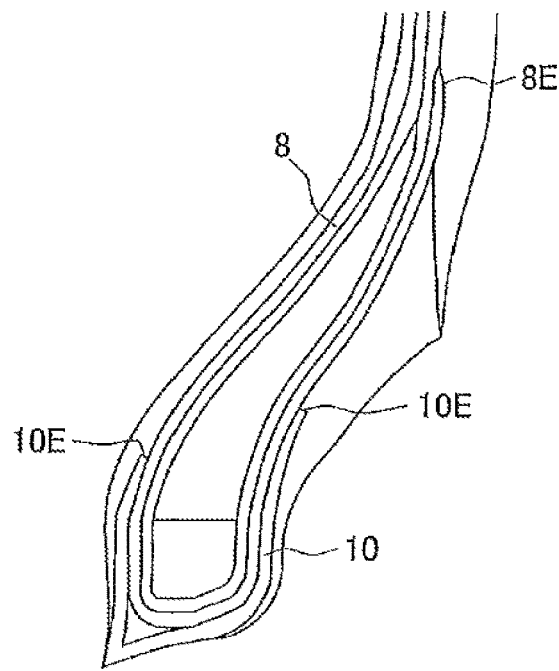
FIG. 5 is a cross sectional view showing an example of a bead portion of a pneumatic radial tire.

With this method, the band-like material 1 is cut together with the formation of the end portion as shown in FIG. 4. As a result, the chafer in which the cut surface of the cord 1C is coated with rubber is obtained. In other words, in the chafer going through the cutting step, the exposure of the cord 1C can be suppressed without use of an additional member such as a rubber sheet. The chafer obtained as mentioned above and having the predetermined length is supplied to a forming of a tire and, for example, buried in the bead portion in the same manner as the chafer 10 in FIG. 5, thereby contributing to the improvement of the durability as a reinforcing member for the tire. Further, the increase in the strain created in the end portion of the chafer is suppressed, and since the additional member is not necessary, the rolling resistance is not deteriorated.

As shown in FIG. 3(c), when the die surfaces 3a and 3b come into contact with the opening edge 5E, the leading end of the pressure cutting die 3 enters the groove 5, and a distance X from the surface of the processing table 2 to the leading end of the pressure cutting die 3 in a groove depth direction (a vertical direction in FIG. 2) goes beyond 0 mm. In order to generate the dragging of the rubber mentioned above, the distance X is preferably equal to or greater than 0.1 mm, more preferably equal to or greater than 0.5 mm, and even more preferably equal to or greater than 1.0 mm. Further, in the light of setting the angles θ3 and θ5 to a preferable magnitude, the distance X is preferably equal to or less than 2.0 mm.

In order to secure a contact area of the die surfaces 3a and 3b with the band-like material 1, it is effective to set the angle θ3 of the leading end larger. From this viewpoint, the angle θ3 of the leading end is preferably an obtuse angle, more preferably equal to or greater than 120 degrees, even more preferably equal to or greater than 150 degrees, and most preferably equal to or greater than 170 degrees. The angle θ3 of the leading end is less than 180 degrees, and preferably equal to or less than 179 degrees.

From the viewpoint of securely cutting the band-like material 1 by the opening edge 5E, the opening angle θ5 is preferably equal to or less than 60 degrees. Therefore, a difference between the opening angle θ5 and the angle θ3 of the leading end is preferably equal to or greater than 25 degrees; however, preferably equal to or less than 154 degrees. Further, in order to make the leading end of the pressure cutting die 3 enter the groove 5, the opening angle θ5 is preferably equal to or greater than 15 degrees, and more preferably equal to or greater than 30 degrees. A distance between a pair of opening edges 5E (a groove width of the groove 5) is, for example, between 6 and 60 mm.

In order to make the cut surface of the cord be smoothly coated with rubber in the cutting step, the band-like material 1 may be heated to a temperature at which the rubber (the uncured rubber) of the band-like material 1 takes on a thermal plasticity. For example, the band-like material 1 can be heated by heating one or both of the processing table 2 and the pressure cutting die 3 by a heater and transmitting the heat from the surface of the processing table 2 and the die surfaces 3a and 3b. The heater can employ the conventionally known heating devices such as a heat medium circulating heating device and a heat transmission heating device without any restriction.

In the embodiment mentioned above, the example has been described in which a bisector of the angle θ3 of the leading end extends in parallel to the thickness direction of the band-like material 1; however, the bisector may be inclined in relation to the thickness direction of the band-like material 1 as long as the die surfaces 3a and 3b are inclined in relation to the surface of the band-like material 1.

In the embodiment mentioned above, the example has been described in which the chafer is manufactured as the cord included rubber sheet; however, it is possible to apply to the manufacturing of the carcass ply as the cord included rubber sheet, for example, without being limited to this example. In this case, since the exposure of the cord (the carcass cord) can be suppressed without use of any additional member by setting the end portion obtained by coating the cut surface of the cord with rubber as mentioned above to a rolled-up end portion (see the end portion 8E in FIG. 5), an advantageous effect can be obtained.

The present invention is not limited to the embodiment mentioned above, but can be improved and modified variously within the scope of the present invention.

EXAMPLES

A description will be given of an example which specifically shows the structure and the effect of the present invention. Each of performance evaluations of the tire was carried out as follows.
(1) Durability A durability test was carried out by a drum type tester in conformity to a condition defined in Federal Motor Vehicle Safety Standard FMVSS139, and a traveling time until any failure was recognized in a bead portion was measured. The evaluation was carried out by an index number on the assumption that the result of a comparative example 1 is 100. The greater the numeric value is, the more excellent the durability is.
(2) Rolling Resistance A rolling resistance was measured in conformity to International Standard ISO28580 (JISD4234), and was evaluated by an inverse number thereof. The evaluation was carried out by an index number on the assumption that the result of the comparative example 1 is 100. The greater the numeric value is, the better the rolling resistance is.
(3) Tire Weight A weight of the formed tire was measured, and the tire weight was evaluated by an inverse number thereof. The evaluation was carried out by an index number on the assumption that the result of the comparative example 1 is 100. The greater the numeric value is, the smaller the tire weight is.

Figure 6:
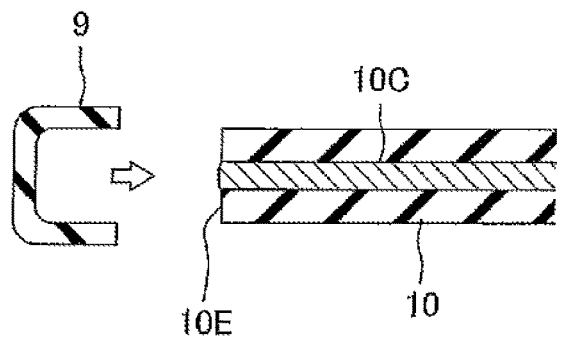
FIG. 6 is a cross sectional view showing an end portion of a chafer which is manufactured according to a conventional method.

Tires (tire size: 215/65R16C 106/104T) were formed by using the chafer manufactured according to the conventional method, and were set to comparative examples 1 and 2. The chafers were structured such that the cords were exposed in the end portions as shown in FIG. 6. In the comparative example 1, the rubber sheet was not attached. In the comparative example 2, the rubber sheet corresponding to an additional member was attached to the end portion and the exposure of the cord was suppressed.

Further, a tire (tire size: 215/65R16C 106/104T) was formed by using the chafer manufactured according to the method for the present invention, and was set to an working example 1. In a used device, an angle of a leading end of a pressure cutting die was 172 degrees, an opening angle of a groove was 60 degrees, and an entering distance of the pressure cutting die (the distance X in FIG. 3) was 1.5 mm. The manufactured chafer was structured such that the cord was not exposed in the end portion as shown in FIG. 4. Except the aspect of the chafer, the tire structures and the rubber compositions are common in the examples. Results of evaluation are shown in Table 1.

TABLE 1

|  | Comparative example 1 | Comparative example 2 | Working example 1 |
|---|---|---|---|
| Durability | 100 | 105 | 110 |
| Rolling resistance | 100 | 99 | 100 |
| Tire weight | 100 | 99 | 100 |

As shown in Table 1, the comparative example 1 is inferior in the durability to the comparative example 2 and the working example 1. The comparative example 2 is excellent in the durability in comparison with the comparative example 1; however, is affected in the rolling resistance and the tire weight due to use of the additional member. On the contrary, in the working example 1, the durability can be improved without affecting the rolling resistance and the tire weight.

Although the tire performance evaluation is not carried out, it was confirmed that a chafer in which a cord was not exposed in an end portion as shown in FIG. 4 could be manufactured, in the case where the angle of the leading end of the pressure cutting die was set to 100 degrees, the opening angle of the groove was set to 30 degrees, and the entering distance of the pressure cutting die (the distance X in FIG. 3) was set to 1.59 mm, in addition to the above.

DESCRIPTION OF REFERENCE NUMERALS

1: band-like material of chafer (example of cord included rubber sheet)
2: processing table
3: pressure cutting die
3a: die surface
3b: die surface
4: carrying mechanism
5: groove
5E: opening edge
$\theta_3$: angle of leading end
$\theta_5$: opening angle

What is claimed is:

1. A method for manufacturing a cord included rubber sheet comprising:
   an arrangement step of supplying a band-like material of a cord included rubber sheet to a processing table, and arranging a portion to be cut in the band-like material onto a groove which is formed in the processing table; and
   a cutting step of cutting the band-like material by moving a pressure cutting die having an angle of a leading end which is larger than an opening angle of the groove and is equal to or greater than 85 degrees, relatively closer to the processing table, and pressing the pressure cutting die in a thickness direction of the band-like material, and obtaining the cord included rubber sheet having a predetermined length,
   wherein the leading end of the pressure cutting die is caused to enter the groove and a die surface of the pressure cutting die is brought into contact with an opening edge of the groove, in the cutting step, and a cut surface of the cord is coated with the rubber of the band-like material in a process that the die surface comes into contact with the opening edge after the leading end of the pressure cutting die is in contact with the band-like material, and
   wherein the opening angle of the groove is equal to or less than 60 degrees.

2. The method for manufacturing a cord included rubber sheet according to claim 1, wherein a distance from a surface of the processing table to the leading end of the pressure cutting die in a groove depth direction is equal to or greater than 0.1 mm when the die surface comes into contact with the opening edge.

3. The method for manufacturing the cord included rubber sheet according to claim 1, wherein the cord included rubber sheet obtained by the cutting step is a chafer.

* * * * *